United States Patent [19]
Oh et al.

[11] Patent Number: 6,106,882
[45] Date of Patent: Aug. 22, 2000

[54] WET TOASTED PASTA AND METHOD OF MANUFACTURE

[75] Inventors: Nam H. Oh, Warren; Silverio Luiz Tecedor, Harrington Park; Richard F. Schryer, High Bridge; Edward J. Meyers, Roselle Park, all of N.J.

[73] Assignee: Bestfoods, Englewood Cliffs, N.J.

[21] Appl. No.: 09/084,140

[22] Filed: May 26, 1998

[51] Int. Cl.⁷ ..................................................... A23L 1/162
[52] U.S. Cl. ............................. 426/557; 426/94; 426/451
[58] Field of Search ..................................... 426/557, 451, 426/94

[56] References Cited

U.S. PATENT DOCUMENTS

| | | |
|---|---|---|
| 2,677,613 | 5/1954 | Shiah . |
| 2,704,723 | 5/1955 | Poole et al. . |
| 3,251,694 | 5/1966 | Scotland et al. . |
| 3,615,677 | 10/1971 | Scharschmidt . |
| 4,044,165 | 8/1977 | Baumann . |
| 4,098,906 | 7/1978 | Hisaki et al. . |
| 4,208,439 | 6/1980 | Hsu . |
| 4,230,735 | 10/1980 | Yoshida et al. . |
| 4,234,617 | 11/1980 | Sakakibara et al. . |
| 4,243,689 | 1/1981 | Kokeguchi et al. . |
| 4,243,690 | 1/1981 | Murakami et al. . |
| 4,251,551 | 2/1981 | VanHullel et al. . |
| 4,271,205 | 6/1981 | Kaneko et al. . |
| 4,346,119 | 8/1982 | Braibanti et al. . |
| 4,368,210 | 1/1983 | Murakami et al. . |
| 4,370,352 | 1/1983 | Murakami et al. . |
| 4,394,397 | 7/1983 | Lometillo et al. . |
| 4,473,593 | 9/1984 | Sturgeon . |
| 4,525,371 | 6/1985 | Blemlek . |
| 4,529,609 | 7/1985 | Gaehring . |
| 4,539,214 | 9/1985 | Winter et al. . |
| 4,540,590 | 9/1985 | Harada et al. . |
| 4,540,592 | 9/1985 | Myer et al. . |
| 4,590,083 | 5/1986 | Hatsugai et al. . |
| 4,783,339 | 11/1988 | Horner . |
| 4,888,193 | 12/1989 | Konno et al. . |
| 4,973,487 | 11/1990 | Wyss et al. . |
| 4,990,349 | 2/1991 | Chawan et al. . |
| 5,063,072 | 11/1991 | Gillmore et al . |
| 5,108,772 | 4/1992 | Wilbur . |
| 5,114,727 | 5/1992 | Brimelow et al. . |
| 5,122,378 | 6/1992 | Hauser et al. . |
| 5,124,168 | 6/1992 | McMillan et al. . |
| 5,128,166 | 7/1992 | Babines et al. . |
| 5,153,017 | 10/1992 | Schaaf . |
| 5,294,452 | 3/1994 | De Francisci . |
| 5,332,592 | 7/1994 | Ishigaki et al. . |
| 5,500,236 | 3/1996 | Miller et al. . |
| 5,700,512 | 12/1997 | Desjardins et al. . |
| 5,728,418 | 3/1998 | Hauset et al. ........................... 426/557 |

*Primary Examiner*—Lien Tran
*Attorney, Agent, or Firm*—Norris, McLaughlin & Marcus

[57] ABSTRACT

Wet toasted pasta products that are quick cooking and have the appearance and texture of regular pasta have now been developed. The products are partially pre-cooked and they have a unique internal porous structure that provides a low density and quick cooking characteristics. The products also are characterized by excellent cooked yield properties. The method of making the products involves sheeting or extrusion under no vacuum or low vacuum followed by toasting under controlled conditions to obtain partially pre-cooked pasta.

12 Claims, 2 Drawing Sheets

WET TOASTED PASTA AND METHOD OF MANUFACTURE

BACKGROUND OF THE INVENTION

1. Field of the Invention

The present invention has to do with pasta products that can be rehydrated quickly. More particularly, the invention relates to quick cooking pasta products having improved appearance, eating quality, dimensional stability and porous structure that can be readily rehydrated in microwave, hot or boiling water pour over and conventional stove top preparations. The invention also has to do with methods of making the pasta products by toasting freshly extruded pasta under carefully controlled conditions.

2. Description of Related Art

Presently available instant or quick cooking pasta and noodles (pasta products) are associated with inferior texture and hydration characteristics. Most of these products are made by extrusion cooking or cooking subsequent to extrusion by immersion in boiling water and/or steam cooking. Extrusion cooking, however, results in deterioration of the pasta texture due to the impact of heat and high shear on the protein matrix prior to and during extrusion. When these products are rehydrated, the texture is mushy or soft, not "al dente". The extrusion cooking process also is costly, requiring sophisticated equipment and control systems. The present invention can utilize less sophisticated, more readily available equipment. The process of the invention is also less time consuming than conventional pasta processing technologies that require extended drying time.

U.S. Pat. No. 3,251,694 describes a pre-cooked macaroni wherein the dough is made in a conventional manner and the fresh pasta is completely pre-cooked and dried at 300–700° F. for about 3 to 9 minutes. The product, however, is expensive because of high processing costs and is limited to pasta shapes that can be extruded with thin walls and still maintain their shape.

According to U.S. Pat. No. 3,615,677, a rapid cooking pasta is made by extruding the dough and drying to a moisture content of less than 12% either with humidified air for 12–48 hours or at a temperature from about 150–300° F. for about 5–120 minutes to at least partially gelatinize the starch. Corn flour in an amount from about 45–85% is a critical ingredient because it serves as a binder and it masks the harsh bitter flavor of soy materials. (Another critical ingredient is soy flour in an amount of 15–40%). The specification provides that for high temperature drying the gelatinization of the starch can be effected prior to, during, or after extrusion and that gelatinization should be at least about 10%, with best results at about 10–75%. The product, however, has poor structural integrity, a soft mushy structure and the harsh bitter flavor of soy material is not effectively masked.

Several other patents describe pasta products which can be rehydrated quickly but they require complete pre-cooking during the manufacturing process. These include U.S. Pat. No. 2,704,723 wherein the fresh pasta is immersed in boiling water before drying, and U.S. Pat. Nos. 4,044,165, 4,394,397 and 4,540,592 wherein combinations of heat and mechanical stress are used during extrusion processes to fully pre-cook the pasta products. All of these products suffer from poor textural qualities and lack of "al dente" texture.

A method of coating pasta for providing a firm texture is described in U.S. Pat. No. 5,144,727. The coating composition is a dried coagulated egg white and an edible oil.

The drawbacks of previously known methods and products are overcome by the new method of the present invention and the new products produced thereby. Applicants have now discovered a method of drying freshly extruded pasta by toasting (i.e. using heated ambient air without added moisture) pasta under controlled conditions to prepare a product having excellent appearance and texture with superior cooked yield and short cook times.

The method of making the pasta products of the invention has lower initial capital equipment requirements and lower ongoing manufacturing cost attributed to shorter drying times. The invention also permits manipulation of the processing conditions to obtain a wide range of pasta densities and textures from soft to firm. Accordingly, the pasta products of the invention can be made to have the "al dente" texture of conventional pasta or a softer or firmer texture.

All percentages and ratios set forth herein are by weight/weight unless designated otherwise. All percentages of ingredients used in recipes to prepare the products of the invention are based on the total weight of ingredients prior to the addition of water to make the dough.

SUMMARY OF THE INVENTION

The toasted pasta products of the present invention have improved product texture and appearance and can be rehydrated quickly by microwave cooking, adding hot or boiling water or by conventional stove top preparation. The products are partially pre-cooked, having a degree of gelatinization from about 15% to about 80%, preferably from about 25% to about 75%. The products also have a moisture content of less than about 13%, i.e. from about 2% to about 13%, and have the appearance (size and shape) of regular dry pasta even when they are extruded from thin wall dies. The products have a low density, from about 0.600 to about 1.05 grams/cubic centimeter ("g/cc"), preferably from about 0.75–1.05 g/cc and this contrasts with prior art pastas which have densities greater than about 1.3 g/cc. The products also have a stabilized pasta matrix wherein the starch is partially gelatinized and protein is partially denatured in such a way as to produce a porous internal structure that is unique in the art. Scanning electron micrographs reveal an open "sponge like" structure where products produced with prior art technologies yield a dense compact structure. The structure of the products of the invention is also believed to be responsible for the superior cooked yields which are from about 315% to about 450%, preferably from about 330% to about 425%.

The manufacturing process of the invention is carried out by toasting freshly extruded or sheeted pasta at a temperature from about 180° F. to about 350° F. for from about 1 to about 25 minutes, preferably at from about 210° F. to about 310° F. for from about 2 to about 15 minutes. Toasting can be conducted in more than one zone and a heating with steaming step can be used just prior to the first toasting zone. When heating with steaming is used, the temperature in that step must be at least 212° F. to cause expansion of the pasta and it can be as high as about 350° F. When there is no heating with steaming step, the minimum temperature in the first (or only) toasting zone also must be 212° F. to cause expansion of the pasta.

The freshly extruded or sheeted pasta has a moisture content from about 15% (semi-moist) to about 35% (wet/moist) before toasting. It is a theory of the invention that higher dough moisture levels facilitate the expansion of the protein starch matrix before it is stabilized by partial denaturation of the protein and partial gelatinization of the starch.

Increased dough moisture produces more steam vapor or leavening effect, resulting in pasta with a more porous, less dense structure. This structure is fixed by heat that, along with higher moisture content in the early stages of toasting, acts to denature protein and to increase the rate of starch gelatinization.

Microwave or conventional preparation methods can be used in conjunction with this invention to achieve fast hydration and completion of the cooking process (further protein denaturation and starch gelatinization). Pasta of the invention can also be prepared by the addition of boiling water.

BRIEF DESCRIPTION OF THE DRAWINGS

Scanning electron microscopy was used to make photomicrographs of cross-sections of the pasta of the invention and previously known pastas. Photomicrographs were obtained using secondary electrons at a magnification of 35 times normal at 10,000 volts. Pieces of pasta were snapped in half by hand to obtain cross-sectional fractures. About ¼ inch below the fracture, each piece was cut with a scalpel to provide a flat surface for mounting on an aluminum stub that fits within the scanning electron microscope ("SEM"). Each mounted sample was gold coated in a sputter coater and then transferred to the SEM chamber.

DETAILED DESCRIPTION OF THE INVENTION

Figure 1:
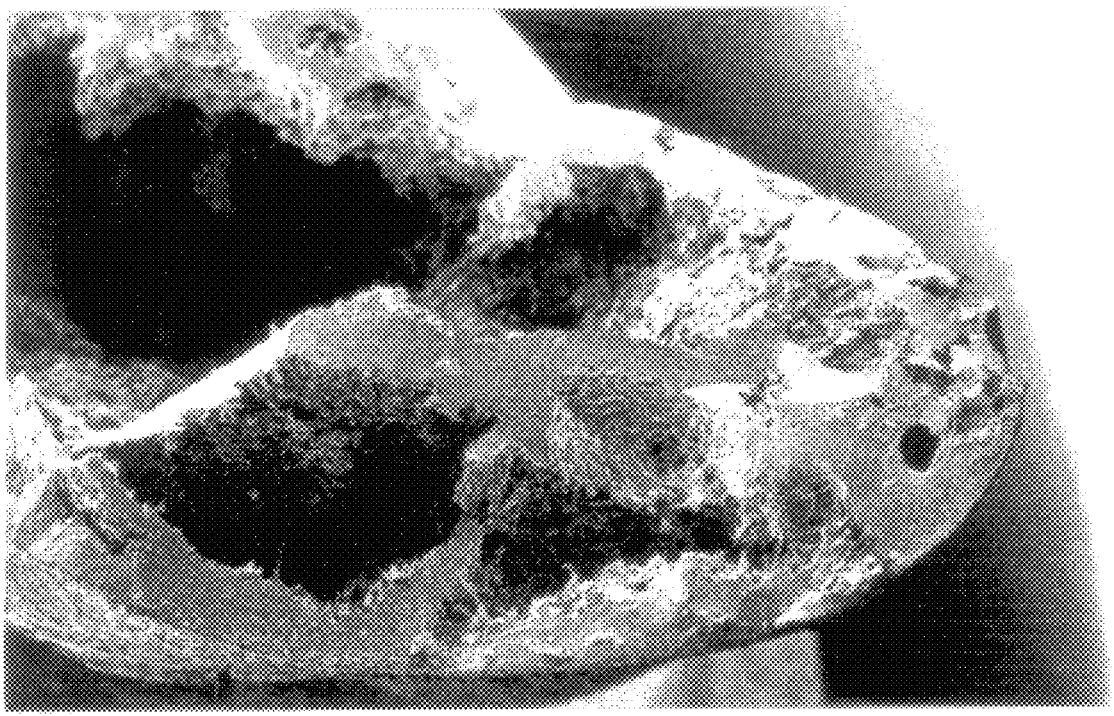
FIG. 1 is a SEM photomicrograph of a pasta of the present invention made according to Example 10 herein.

A pasta dough is made with wheat flour and water and, optionally, with other conventional ingredients using known processing techniques such as extrusion or sheeting. Accordingly, the ingredients are combined and hydrated with sufficient water to attain the desired consistency and kneaded to make the dough. The dough can be formed into the desired shape by extrusion through a die plate or by sheeting and then it is cut into pieces of the desired size.

The ingredients of the pasta of the invention comprise wheat flour selected from the group consisting of semolina, farina, durum, hard wheat and soft wheat flours and pasta regrind from wheat based pastas and the like. Alternate flours such as those from rice and corn can be employed in amount from 0% to about 15% and preferably less then about 10%. Starches from sources such as rice, corn or potato also can be employed in amounts from 0% to about 20%, preferably less then about 15%. Protein sources can be optionally added in amounts from 0% to about 10% and when they are used they typically are added in amounts of at least about 0.5%. Typical protein sources include wheat gluten, milk protein, soy protein and eggs in any form including whole eggs, egg whites, powdered eggs, powdered egg whites and the like. A variety of natural and artificial flavors, herbs, spices, cheeses and the like also can be employed in amounts from 0% to about 15% and when they are employed they typically are added in amounts of at least about 0.1%.

Traditional vacuum levels for pasta dough extrusion are about 22 inches mercury (Hg). According to the present invention, however, extrusion is conducted at ambient pressure levels (no vacuum) or at low vacuum, i.e. less than about 12 inches Hg. When vacuum is employed, the vacuum is maintained in the mixing chamber and screw conveying chambers of the extruder. The ambient extrusion without vacuum or with low levels of vacuum causes the extruded dough to be produced with many evenly distributed fine air cells. These air cells act as nucleation sites for air expansion and, more importantly, for moisture vapor to collect and expand to create a porous matrix during toasting. Using a full vacuum (i.e. traditional levels) according to the process of the invention produces a product having an uneven internal structure and an uneven external appearance.

The expanded cell structure is responsible for a porous pasta product (pasta or noodle) structure that creates an attractive product (having the appearance of regular pasta) and insures faster hydration during preparation by microwave, hot or boiling water pour over preparation or conventional stove top preparation.

In practice we have found that the moisture content of extruded pasta products before toasting can be varied from about 15% (semi-moist) to about 35% (wet/moist). Moisture content at the higher end of the range is preferred when a faster rehydration time is desired. This is attributed in part to a slightly higher degree of starch gelatinization (cooking) that occurs when more moisture is available during toasting. Increased moisture also increases the expansion of the protein-starch matrix during toasting to create a "sponge like" structure that is also responsible for the short cook times achieved by this invention.

In one example, pasta produced by this invention decreased hydration time versus conventional pasta by 3 minutes and eliminated the starchy, uncooked texture and flavor associated with the undercooked conventional pasta being used as a comparison. Overall, the decreased cook times of this invention are the result of the partial cook (partial gelatinization) of the starch and, more importantly, the result of the open "sponge-like" character of the protein-starch matrix as illustrated in FIG. 1. This structure provides channels for hot water to penetrate rapidly, hydrate and cook the pasta.

For the present invention, control of density and texture is directly linked to the control of the toasting conditions employed and the moisture content the of pasta dough. It has been found that higher toasting temperature in first and subsequent toasting zones increases pasta porosity and decreases pasta density. For example, toasting at temperatures from about 180° F. up to about 325° F. caused the pasta density to continue to decrease. However, when the temperature was held at 325° F. or higher for too long, an increase in pasta density was observed, indicating a partial collapse in the protein starch matrix. These data are illustrated in Table I. This collapse was apparently the result of overextending or stressing the protein starch matrix.

TABLE I

| Test # | Zone 1 ° F. | Zone 2 ° F. | Density (g/cc) |
|---|---|---|---|
| 3 | 276 | 325 | 0.802 |
| 7 | 276 | 325 | 0.815 |
| 4 | 325 | 325 | 0.832 |
| 8 | 325 | 325 | 0.825 |

According to the present invention, freshly mixed pasta dough at a moisture content of from about 15% to about 35% moisture, preferably from about 26% to about 33% moisture, is extruded or sheeted to form the desired thin or thick walled pasta. The moist pasta is then cut to the desired size and the pieces are processed by toasting at a temperature from about 180° F. to about 350° F. for from about 1 to about 25 minutes. The preferred processing temperature range is from about 210° F. to about 310° F. for from about 2 to about 15 minutes to attain a moisture content of less than about 13%, i.e., from about 2% to about 13%, preferably from about 5% to about 12%. Toasting can be conducted in more than one zone and a heating with steaming step can be used just prior to the first toasting zone. When heating with steaming is used, the temperature in that step must be at least 212° F. to cause expansion of the pasta and it can be as high as about 350° F. When there is no heating with steaming step; the minimum temperature in the first (or only) toasting zone also must be 212° F. to cause expansion of the pasta.

In a preferred embodiment of the invention, toasting is conducted in two or more toasting zones as mentioned above. Additionally, the optional step of heating and steaming the pasta just prior to toasting can be used further to partially cook the pasta and set the pasta surface. The preferred toasting time and temperature is varied depending upon pasta shape, thickness, and the texture desired. Thicker moist pasta will require longer toasting times and/or higher temperatures.

The degree of expansion and resulting pasta product density can be manipulated to deliver the desired texture, hydration and cook time. A significant advantage of this invention is in the ability to control the pasta thickness and the degree of porosity/density needed to obtain the desired preparation time and texture. Product density is controlled so that the product will have a density from about 0.600 to about 1.050 g/cc. The preferred range of density is generally from about 0.700 to 1.000 g/cc. In practice the preferred range of density is dependent on the specific application for which the pasta will be used. Control of product density is one of the distinguishing characteristics of this invention. Furthermore, the density of the pasta produced by this invention sets it apart from the higher density, more than about 1.3 g/cc, of commercially available precooked pasta and conventionally produced pasta.

Density determinations were made according to the invention using silicone oil according to the following procedure. An 8 ounce jar was preweighed on a top loading balance sensitive to 0.01 grams and precalibrated for volume using Silicone Oil (Fisher Scientific Cat. No. S159-500). 25.0+/−0.5 grams of pasta was accurately weighed into the jar and enough Silicone Oil at 23° C. temperature was added to just cover the pasta. A thin metal spatula was used to stir the mass to release any trapped air. Addition of Silicone Oil was resumed until the oil was almost to the rim of the jar. A preweighed flat 4 and ½ inch square, ⅛ inch thick plastic plate containing 24, 1/16 inch holes and one center ¼ inch hole within the area of the top of the jar was placed on top of the jar. It was positioned so that the large hole in the center was close to the center of the jar opening. Silicone Oil was again added with a pipette into the center hole until all air was excluded from beneath the plate.

The density of the silicone oil at 23° C. of 0.961 g/cc was divided into the weight required to fill the empty jar to establish the jar volume and separately into the weight of the oil added to fill the jar when it contained the pasta, to establish the volume of the pasta by difference. After the pasta weight was adjusted for its moisture content to obtain the weight on a dry basis, the pasta weight was divided by the determined pasta volume to obtain the pasta density.

Density control according to the invention is achieved by the controlling the toasting time and temperature in the toasting zone, and preferably in two or more separate toasting zones. Control of the extrusion process (moisture content and vacuum level) and the toasting process (toaster residence time and toasting temperature) will control the product density.

In the first toasting zone, and to a lesser degree in any second and subsequent zones, the pasta dough is pliable and has the greatest amount of moisture available for conversion to steam for matrix expansion within the pieces of pasta. It has been observed, however, that a very high degree of matrix expansion (very low product density) can result in fragile pasta with a soft texture and poor product integrity. On the other hand, too little expansion (high product density) will decrease porosity, increase preparation time requirements and reduce cooked yield. Some cooking of the dough can also take place in the first toasting zone. After the first and second toasting zones, subsequent toasting zones can be utilized to further reduce moisture content.

Toasting temperatures in the toasting zones are kept in a range from about 180° F. to about 350° F. with the preferred range being from about 210° F. to about 310° F.

Air velocity during toasting has been found to be important to drying uniformity and product uniformity. Effective air velocities employed are from about 150 to 800 feet per minute with the preferred range being from about 250 to 800 feet per minute. Airflow velocities are varied depending on the product shape, thickness and the desired final moisture content of the pasta to attain desired product uniformity and rate of moisture loss.

Following toasting, the toasted pasta is removed from the toaster and cooled to ambient temperature by conventional means such as by using a forced air cooler.

As noted above, the products of the invention are partially pre-cooked, having a degree of gelatinization from about 15% to about 80%, preferably from about 25% to about 75%. In order to determine the degree of gelatinization of a pasta product, the total heat absorbed during the gelatinization of a weighed portion of pasta in sufficient water is measured by a differential scanning calorimeter (DSC).

To accomplish this, at least 10 grams of the product is finely ground and 10 milligrams (mg) of this is weighed into the bottom portion of a special stainless steel capsule which fits in the instrument. The weighing is done on a microbalance accurate to at least 0.01 mg. Twenty mg of water is then injected into the capsule bottom on top of the pasta and the total weight of the capsule contents obtained. The lid of the capsule, which is fitted with a neoprene "O" ring, is placed on the capsule bottom as a cover. Pressure is applied to form a hermetic seal which will prevent the loss of moisture during heating. The capsule is placed in the sample well of the DSC instrument chamber and a sealed empty capsule is placed in the reference well. The chamber is uniformly heated at a constant rate and the difference in the heat absorbed by the sample over the blank is determined in joules/gram for a peak in a region of the resulting thermogram near 70° C. This result is subtracted from the value similarly determined for a sample of the raw wheat component (such as semolina or durum wheat) utilized in making the product. Since the two values represent how much heat was required to gelatinize the remaining ungelatinized starch present in the individual samples, the difference expressed as a % is the level, to which the product has already been gelatinized.

The products of the invention also exhibit superior cooked yield (sometimes referred to the art simply as yield or % hydration). In order to determine cooked yield, optimum cook time must be measured and this was done using the chewing method and the squeeze method for each sample and using the results of the method that gave the shortest cook time.

According to the chewing method, 25 grams of dry pasta is cooked in a beaker containing 300 ml of boiling distilled water. A timer is started and pieces of cooked pasta are removed from the cooking water at 30 second intervals. The pieces are chewed through between molar teeth. The optimum cook time is the time when no hard core is detected for the first time.

According to the squeeze method, 25 g of the same dry pasta formulation is cooked in a beaker containing 300 ml of boiling distilled water. A timer is started and pieces of cooked pasta are removed from the cooking water at 30 second intervals and placed between two pieces of clear plastic. The optimum cook time is the time when a white center core of cooked pasta disappears for the first time. (See Method 16-50, AACC in the 1995 Edition of Methods of the American Association of Cereal Chemists, 3340 Pilot Knob Road, St. Paul, Minn. 55121 USA).

Cooked yield then is determined by adding 10 grams of the same dry pasta formulation to 300 grams of boiling distilled water and cooking for the optimum cook time as determined above. Then the cooked pasta is drained on a sieve for 5 minutes and weighed. The cooked yield of the pasta is reported as a percentage of the initial dry pasta weight of 10 grams. The cooked yield of the pasta of the invention is from about 315% to about 450%, preferably from about 330% to about 425%.

Variations on our invention include the use of steam prior to the toasting process to modify product attributes by increasing product integrity, is increasing resistance to "checking or cracking", reducing starch loss, increasing pasta firmness and increasing tolerance to over cooking. This can be achieved by introducing food grade steam into the same apparatus that otherwise would be used for toasting. Steam functions to precook starch and to denature protein on the surface of the pasta products. This process modification significantly strengthens the protein-starch matrix. The degree of starch gelatinization and protein insolubility can be used as indicators of the type and extent of processing, bearing in mind that the product of the invention is not fully pre-cooked.

Steaming also increases our ability to design products with the product attributes indicated. These attributes are especially important in that they improve product performance in many convenience oriented preparation methods such as microwave, boiling water pour-over, and stove-top preparations.

Further improvements in preparation time can be achieved by the addition of salt. The addition of up to about 3% salt based on the weight of the farinaceous material (such as wheat, corn, soy flours, semolina, farina and the like) also improves hydration by creating voids within the structure of the pasta and noodles after the salt dissolves during cooking. Highly soluble salts dissolve leaving fine trails or voids in the pasta structure that facilitates water penetration during cooking. For example, a 2% salt level improved preparation time during one microwave application to 4 to 4.5 minutes when compared to a 5 minute microwave preparation time without salt.

Manipulating the type, quality and quantity of protein in the extruded dough modifies pasta product performance. The addition of protein sources, such as vital wheat gluten, egg proteins, soy and other food grade protein sources in amounts from about 0.25% to about 10% can be used to modify the pasta product attributes, with the typical range being from about 0.5% to 5.0%. Protein sources are especially useful when farinaceous materials are utilized that are low in protein content or in instances where the native protein functionality is lacking. Added proteins can be used to modify texture, increase firmness, reduce starch loss, improve tolerance to overcooking and maintain product integrity during rigorous preparation procedures that require frequent stirring.

By controlling the dough moisture, toast conditions and modifying the protein matrix it is possible to design the pasta product texture and hydration characteristics to suit specific preparation methods. Under the present invention, it is now possible to "design pasta" that has the characteristics of reduced cooking time and to create the desired pasta texture.

The method of the invention can be applied to any shape of pasta. Pasta can be made in any short and long good shape and may be of conventional or thin wall thickness. Wall thicknesses are chosen as a function of the type of preparation method and preparation time requirements needed.

The wet toasted pasta products can also be made into a snack or flavored by incorporating a variety of natural and artificial flavors, herbs, spices, cheeses and/or other ingredients to impart the desired flavor and appearance. Flavors can be blended with the farinaceous materials prior to extrusion and/or can be coated on the surface.

EXAMPLES

Example 1

A wheat flour dough mix made of 77% of semolina and 23% of water was fed to a Demaco laboratory pasta press, fitted with a rotini die and a cutting knife, which extruded formed pieces of fresh pasta (32% moisture) with a pasta thickness of 0.027". Unlike the typical pasta extrusion process, no vacuum was used during pasta extrusion. The extruded pieces as formed were transferred to a forced air cooler fitted with an air blower to remove the surface moisture of the freshly extruded pasta and to prevent the pasta pieces from sticking together during subsequent processing steps. The surface dried pasta was transferred to a laboratory Proctor & Schwartz toaster (a "P&S" toaster available from Proctor & Schwartz, 251 Gibraltar Road, Horsham, Pa. 19044 USA) and toasted at 298° F. for 2.25 min. with an air velocity setting of 250 ft/min. Then, the toasted pasta was removed from the toaster and cooled to ambient temperature by using a forced air cooler. Unlike typical dried pasta, the toasted pasta had an expanded internal structure with many expanded air cells, which made the toasted pasta cook faster than regular pasta while maintaining typical pasta texture under regular cooking in boiling water and microwave cooking. The density of the toasted pasta was 0.78 g/cc, degree of gelatinization was 59.3% and cooked yield was 348% at the optimum cook time of 3 minutes.

Example 2

The same dough formulation was extruded and air dried as in Example 1. The surface dried pasta was transferred to a laboratory P&S toaster and toasted at 260° F. for 14 min. with an air velocity setting of 250 ft/min. Then, the toasted pasta was removed from the toaster and cooled to ambient temperature by using the forced air cooler. Unlike typical dried pasta, the toasted pasta had an expanded internal structure with many expanded air cells, which made the toasted pasta cook faster than regular pasta while retaining the texture of typical pasta under various types of cooking conditions (regular cooking in boiling water and microwave cooking). The density of the toasted pasta was 0.83 g/cc, degree of gelatinization was 24.1% and the cooked yield was 337% at the optimum cook time of 4 minutes.

Example 3

The same dough formulation was extruded and air dried as in Example 1. The surface dried pasta was transferred to a laboratory P&S toaster and toasted at 285° F. for 5 min. with an air velocity setting of 250 ft/min. Then, the toasted pasta was removed from the toaster and cooled to ambient temperature by using the forced air cooler. Unlike typical dried pasta, the toasted pasta had an expanded internal structure with many expanded air cells, which made the toasted pasta cook faster while retaining typical pasta texture under various types of cooking conditions (regular cooking in boiling water and microwave cooking). The density of the toasted pasta was 0.95 g/cc, degree of gelatinization was 40.6% and cooked yield was 371% at the optimum cook time of 3.5 minutes.

Example 4

A wheat flour dough mix made of 76% of semolina, 23% of water and 1% of table salt was fed to a Demaco laboratory pasta press, fitted with a rotini die and a cutting knife, which extruded formed pieces of fresh pasta (32% moisture) with a pasta thickness of 0.027". No vacuum was used during pasta extrusion. The extruded pieces as formed were transferred to a forced air cooler fitted with an air blower to remove surface moisture of the freshly extruded pasta to prevent pasta pieces from sticking together during subsequent processing steps. The surface dried pasta was transferred to a laboratory P&S toaster and toasted at 298° F. for 2.25 min. with an air velocity setting of 250 ft/min. Then, the toasted pasta was removed from toaster and cooled to ambient temperature by using the forced air cooler. This product cooked even faster because of the expanded internal structure and the presence of salt which helps cooking water penetrate into the internal structure under various types of cooking conditions (regular cooking in boiling water and microwave cooking). The density of the toasted pasta was 0.81 g/cc, degree of gelatinization was 46.8% and cooked yield was 343% at the optimum cook time of 2.25 minutes.

Example 5

A wheat flour dough mix made of 78% of semolina and 22% of water was fed to a Buhler pasta press model TPAE, fitted with a rotini pasta die and a cutting knife, which extruded formed pieces of fresh pasta (31% moisture) with a pasta thickness of 0.027". No vacuum was used during pasta extrusion. The extruded pasta as formed was transferred pneumatically to a Buhler fluid bed toaster, model DNTW, and was toasted at 277° F. for 6 min. with an air velocity setting of 670 ft/min. Then, the toasted pasta was cooled to ambient temperature in the cooling zone of the toaster. Unlike typical dried pasta, the toasted pasta had an expanded internal structure with many small air cells, which made the toasted pasta cook faster than regular pasta while maintaining a typical pasta texture under various types of cooking conditions (regular cooking in boiling water and microwave cooking). The density of the toasted pasta was 0.83 g/cc, degree of gelatinization was 60.3% and cooked yield was 377% at the optimum cook time of 2.5 minutes.

Example 6

The same pasta formulation as used in Example 5 was extruded under the same conditions and transferred pneumatically to a Buhler fluid bed toaster, model DNTW. The pasta was toasted at 327° F. for 2 min. with an air velocity setting of 670 ft/min. for the 1st zone and at 277° F. for 2 min with the same air velocity for the 2nd zone. Then, the toasted pasta was cooled to ambient temperature in the cooling zone of the toaster. Unlike typical dried pasta, the toasted pasta had an expanded internal structure with many expanded air cells, which made the toasted pasta cook faster than regular pasta while retaining typical pasta texture under various types of cooking conditions (regular cooking in boiling water and microwave cooking). The density of the toasted pasta was 0.76 g/cc, degree of gelatinization was 71.2% and cooked yield was 389% at the optimum cook time of 3 minutes.

Example 7

The same pasta formulation as used in Example 6 was extruded under the same conditions and transferred pneumatically to a Buhler fluid bed toaster, model DNTW, where the pasta was toasted at 212° F. for 4 min. with an air velocity setting of 670 ft/min. for the 1st zone and at 284° F. for 4 min. with the same air velocity for the 2nd zone. Then the toasted pasta was cooled to ambient temperature in the cooling zone of the toaster. Unlike typical dried pasta, the toasted pasta had an expanded internal structure with small air cells, which made the toasted pasta cook faster than regular pasta with typical pasta texture under various types of cooking conditions (regular cooking in boiling water and microwave cooking). The density of the toasted pasta was 0.99 g/cc, degree of gelatinization was 31.9% and cooked yield was 383% at the optimum cook time of 3 minutes.

Example 8

The same dough formulation was extruded and air dried as in Example 1. The surface dried pasta was transferred to a laboratory P&S toaster conditioned with steam by injecting 15 lbs of steam into the toaster. The pasta was heated at 298° F. for 1.0 min with steam and then toasted for 1.25 min without steam by disconnecting the steam line. Then the toasted pasta was removed from the toaster and cooled to ambient temperature by using the forced air cooler. This product had the same expanded internal structure as toasted pasta that was not steam treated but it had better structural integrity than toasted pasta that was not steam treated. It also had the same textural and cook time characteristics as the toasted pasta that was not steam treated. The toasted pasta had a density of 0.95 g/cc, a degree of gelatinization of 56.5% and a cooked yield of 365% at the optimum cook time of 3 minutes.

Example 9

A wheat flour dough mix made of 73.6% of semolina, 23% of water, 1.8% of wheat gluten and 1.6% of powered egg white was fed to a Demaco laboratory pasta press fitted with a rotini die and a cutting knife, which extruded formed pieces of fresh pasta (32% moisture) with a pasta thickness of 0.027". No vacuum was used during pasta extrusion. The extruded pieces as formed were transferred to a forced air cooler fitted with an air blower to remove surface moisture of the freshly extruded pasta to prevent pasta pieces from sticking together during subsequent processing steps. The surface dried pasta was transferred to a laboratory P&S toaster and toasted at 298° F. for 2.25 min with an air velocity setting of 250 ft/min. The toasted pasta then was removed from the toaster and cooled to ambient temperature by using the forced air cooler. This product had the expanded internal structure observed in the other toasted pastas of the invention but it required slightly longer cook time than the toasted pastas with no added wheat gluten and egg white. The product had firm textural bite characteristics and excellent structural integrity. The toasted pasta had a density of 0.85 g/cc, a degree of gelatinization of 61.4% and a cooked yield of 317% at the optimum cook time of 4.5 minutes.

Example 10

A wheat flour dough mix made of 77% of semolina and 23% of water was fed to a plant scale Buhler press, model TPR, fitted with a rotini die and a cutting knife, which extruded formed pieces of fresh pasta (32% moisture) with a pasta thickness of 0.027". No vacuum was used during pasta extrusion. The extruded pasta as formed were transferred to a production scale P&S belt type toaster with 3 heating zones and 1 cooling zone by a shaker conveyor fitted with an air blower to remove surface moisture of the freshly extruded pasta. Then the pasta was toasted for 2 min. at 300° F. for zone 1, for 2 min at 266° F. for zone 2, for 2 min at 220° F. for zone 3 and was cooled for 2 min with ambient air. Unlike typical dried pasta, the toasted pasta had an expanded internal structure with many expanded air cells, which made the toasted pasta cook faster while retaining typical pasta texture under various types of cooking conditions (regular cooking in boiling water and microwave cooking). The toasted pasta had a density of 0.75 g/cc, a degree of gelatinization of 68.2% and a cooked yield of 398% at the optimum cook time of 3 minutes.

Comparative Example 1

A dough mix of 45% corn flour, 25% soy flour and 30% hard wheat flour was dry blended in a Hobart mixer. Water was admixed with the dry blend to make a dough having 35% water. A DeMaco laboratory pasta press, fitted with a rotini die and a cutting knife, was used to extrude pieces of fresh pasta. A vacuum of 17 inches Hg was used during extrusion.

Figure 2:
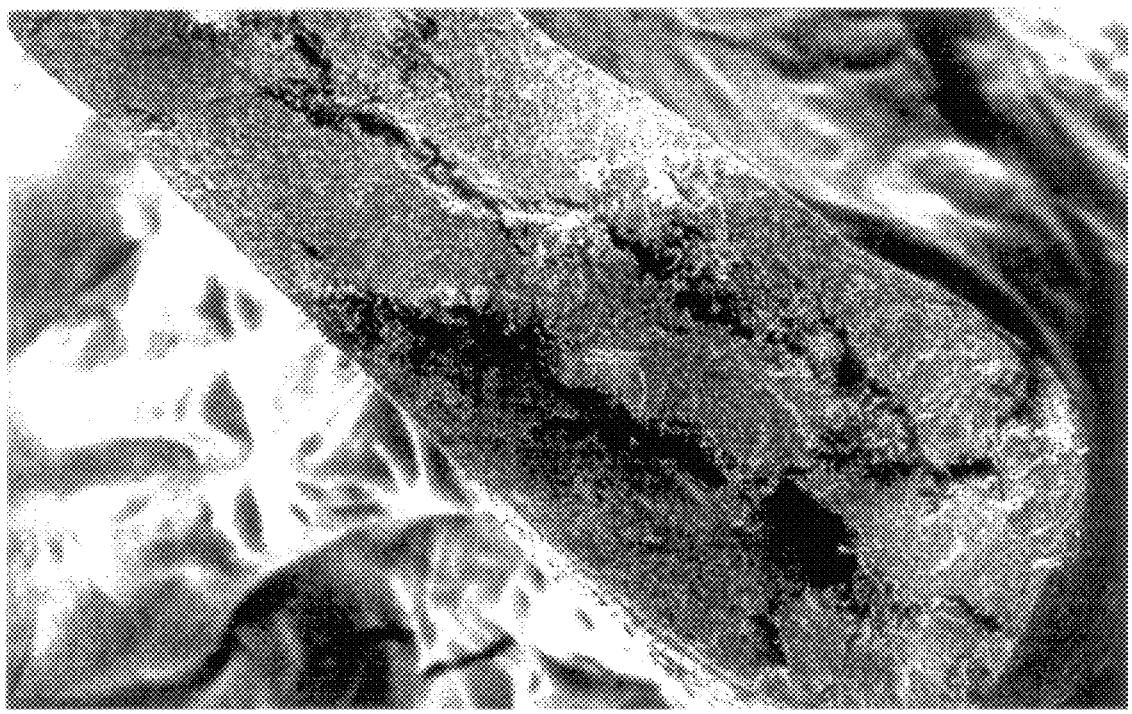
FIG. 2 is a SEM photomicrograph of a pasta made according to U.S. Pat. No. 3,615,677, Comparative Example 1 herein, and dried for 15 minutes at 225° F.

A first portion of the pasta was toasted at 225° F. for 15 minutes and a photomicrograph was taken of a section of one piece. This photomicrograph is FIG. 2.

Figure 3:
FIG. 3 is a SEM photomicrograph of the same pasta as made for FIG. 2, but with drying for 3 minutes at 300° F.

A second portion of the pasta was toasted at 300° F. for 3 minutes and a photomicrograph was taken of a section of one piece. This photomicrograph is FIG. 3.

The pasta dough was well mixed but it had a lumpy texture. The pasta product had poor structural integrity. It also had a soft mushy texture when it was hydrated and a harsh bitter soy flavor.

Comparative Example 2

Figure 4:
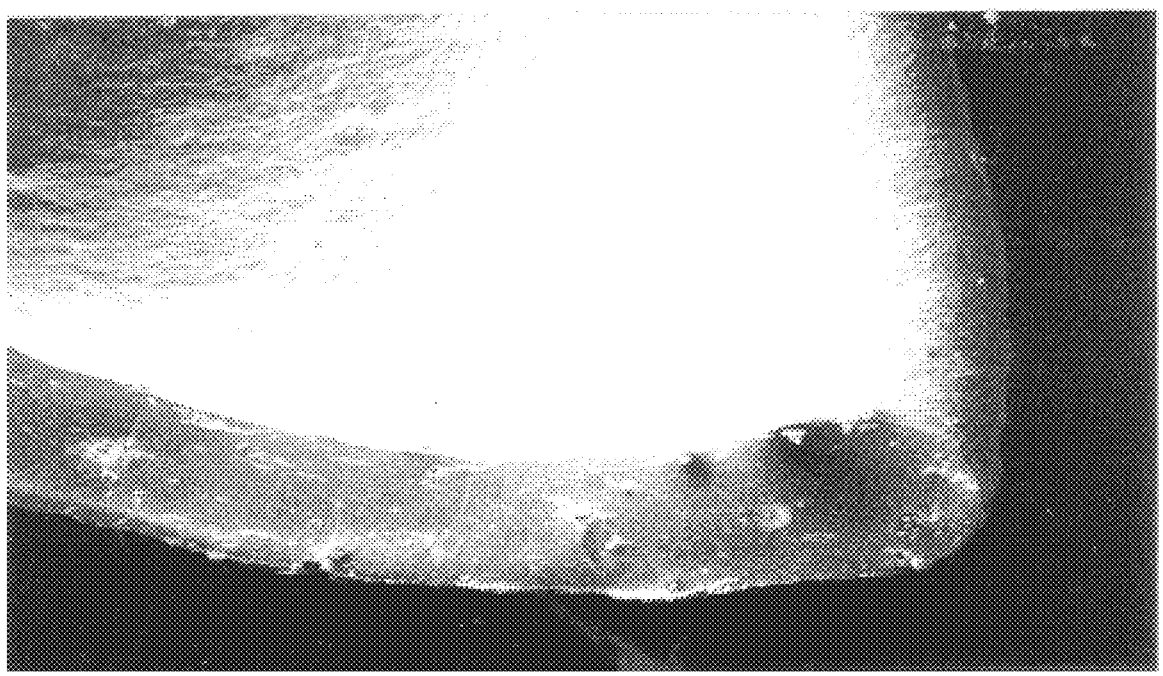
FIG. 4 is a SEM photomicrograph of a commercially available pasta product that is said to rehydrate quickly.

A sample of a commercially available thin-walled pasta product that rehydrates quickly, Instant Pasta-Spirals from N. V. Establ. Joseph Soubry S. A., Ardooisesteenweg 110, 8800 Roeselare, Belgium, was prepared for SEM analysis as set forth above. A photomicrograph of the sample is shown in FIG. 4, illustrating the dense nature of the product.

Comparing the photomicrographs of FIGS. 1–4, none of the comparative products (FIGS. 2–4) exhibit the open internal porous structure of the pasta of the present invention, FIG. 1.

What is claimed is:

1. A quick cooking, partially pre-cooked pasta product having an expanded cell structure and a stabilized protein starch matrix with a porous internal structure, said pasta product having a density from about 0.6 to about 1.05 g/cc and a degree of gelatinization from about 15% to about 80%.

2. The product of claim 1 having a density from about 0.7 to about 1.00 g/cc.

3. The product claim 1 having a degree of gelatinization from about 25% to about 75%.

4. The product of claim 1 having a moisture content of less than about 13%.

5. The product of claim 4 comprising a wheat flour dough.

6. The product of claim 4 consisting essentially of a wheat flour dough.

7. A quick cooking, partially pre-cooked pasta product having an expanded cell structure and a stabilized protein starch matrix with a porous internal structure, said pasta product having a cooked yield from about 315% to about 450% and a degree of gelatinization from about 15% to about 80%.

8. The product of claim 7 having a cooked yield from about 330% to about 425%.

9. The product claim 7 having a degree of gelatinization from about 25% to about 75%.

10. The product of claim 7 having a moisture content of less than about 13%.

11. The product of claim 10 comprising a wheat flour dough.

12. The product of claim 10 consisting essentially of a wheat flour dough.

* * * * *